(12) United States Patent
Dyson et al.

(10) Patent No.: US 9,924,845 B2
(45) Date of Patent: Mar. 27, 2018

(54) ROBOT CLEANER

(71) Applicant: Dyson Technology Limited, Wiltshire (GB)

(72) Inventors: James Dyson, Bristol (GB); Michael David Aldred, Swindon (GB); Leanne Joyce Garner, Bristol (GB)

(73) Assignee: DYSON TECHNOLOGY LIMITED, Malmesbury, Wiltshire (GB)

( * ) Notice: Subject to any disclaimer, the term of this patent is extended or adjusted under 35 U.S.C. 154(b) by 9 days.

(21) Appl. No.: 14/843,444

(22) Filed: Sep. 2, 2015

(65) Prior Publication Data

US 2016/0058261 A1    Mar. 3, 2016

(30) Foreign Application Priority Data

Sep. 3, 2014 (GB) .................... 1415607.9

(51) Int. Cl.

| | |
|---|---|
| *B08B 1/00* | (2006.01) |
| *A46B 13/00* | (2006.01) |
| *G06K 9/00* | (2006.01) |
| *A47L 11/10* | (2006.01) |
| *A47L 13/22* | (2006.01) |

(Continued)

(52) U.S. Cl.

CPC .............. *A47L 11/40* (2013.01); *A47L 7/00* (2013.01); *A47L 11/4061* (2013.01); *G05D 1/024* (2013.01); *G05D 1/0242* (2013.01); *G05D 1/0246* (2013.01); *A47L 2201/00* (2013.01); *A47L 2201/04* (2013.01); *G05D 2201/0203* (2013.01); *Y10S 901/01* (2013.01)

(58) Field of Classification Search

CPC .. B08B 1/00; A46B 13/00; G06K 9/00; A47L 11/10; A47L 13/22; A47L 11/4061; A47L 11/4066

USPC ...... 55/385.1, DIG. 3, DIG. 34; 15/49.1, 98, 15/319, 320, 340.1, 228, 230, 322, 21.1; 134/18

See application file for complete search history.

(56) References Cited

U.S. PATENT DOCUMENTS 8,898,844 B1 * 12/2014 Dooley .................. A47L 11/10
                                                         15/319
2005/0022485 A1 * 2/2005 Park .......................... A47L 7/04
                                                         55/385.1

(Continued)

FOREIGN PATENT DOCUMENTS

| DE | 19614916 | 11/1997 |
|---|---|---|
| GB | 2278937 | 12/1994 |

(Continued)

OTHER PUBLICATIONS

International Search Report and Written Opinion dated Oct. 13, 2015, directed towards International Application No. PCT/GB2015/052322, 8 pages.

(Continued)

*Primary Examiner* — Frank Lawrence, Jr.
*Assistant Examiner* — Minh-Chau Pham
(74) *Attorney, Agent, or Firm* — Morrison & Foerster LLP

(57) ABSTRACT

A robot cleaner including: a body; and a sensor protruding from a top surface of the body, wherein the body includes a protrusion positioned forward of the sensor relative to a forward driving direction of the robot cleaner, the protrusion extending to a height that is at least equal to the height of the sensor.

5 Claims, 5 Drawing Sheets

(51) Int. Cl.
*A47L 11/40* (2006.01)
*A47L 7/00* (2006.01)
*G05D 1/02* (2006.01)

(56) References Cited

U.S. PATENT DOCUMENTS

| | | | |
|---|---|---|---|
| 2005/0165508 A1 | 7/2005 | Kanda et al. | |
| 2006/0056677 A1* | 3/2006 | Tani | G05D 1/0242 |
| | | | 700/259 |
| 2011/0010873 A1* | 1/2011 | Kim | A47L 7/02 |
| | | | 15/4 |
| 2013/0098401 A1* | 4/2013 | Yoon | A47L 11/33 |
| | | | 134/18 |
| 2015/0265125 A1* | 9/2015 | Lee | A47L 11/4061 |
| | | | 701/26 |
| 2016/0144512 A1* | 5/2016 | Kim | H04N 17/002 |
| | | | 15/319 |

FOREIGN PATENT DOCUMENTS

| | | |
|---|---|---|
| GB | 2404438 | 2/2005 |
| JP | S-60-141891 | 9/1985 |
| JP | 2005-46591 | 2/2005 |
| KR | 10-2014-0042494 | 4/2014 |
| KR | 10-2014-0087183 | 7/2014 |
| WO | WO-2004/031878 | 4/2004 |

OTHER PUBLICATIONS

Combined Search and Examination Report dated Feb. 27, 2015, directed towards GB Application No. 1415607.9; 3 pages.

* cited by examiner

ROBOT CLEANER

REFERENCE TO RELATED APPLICATIONS

This application claims priority of United Kingdom Application No. 1415607.9, filed on Sep. 3, 2014, the entire contents of which are incorporated herein by reference.

FIELD OF THE INVENTION

The present invention relates to a robot cleaner.

BACKGROUND OF THE INVENTION

Mobile robots are becoming increasingly commonplace and are used in such diverse fields as space exploration, lawn mowing and floor cleaning. Recently there has been a rapid advancement in the field of robotic cleaning devices, especially robot vacuum cleaners and floor mopping robots, the primary objective of which is to navigate a user's home autonomously and unobtrusively whilst cleaning the floor.

In performing this task, a robotic cleaner has to navigate the area which it is required to clean. Robots are usually provided with a number of sensors that enable them to navigate around an environment. A large variety of sensors have been employed on robots to assist with navigation. For example, some robots utilise infra-red detectors that allow the robot to navigate towards an IR beacon, and some robots use complex vision systems that utilise cameras to view, understand and navigate around a local environment surrounding the robot.

Robots are often required to negotiate obstacles within the environment in which they are placed. For example it is usual for robot vacuum cleaners to have to contend with furniture such as chairs, sofas and tables. Because robot cleaners are intended to work as autonomously as possible, they typically have dimensions that will allow them to pass underneath some low-clearance obstacles in order that they can continue to clean underneath without requiring any user involvement.

SUMMARY OF THE INVENTION

This invention provides a robot cleaner comprising: a body; and a sensor protruding from a top surface of the body, wherein the body comprises a protrusion positioned forward of the sensor relative to a forward driving direction of the robot cleaner, the protrusion extending to a height that is at least equal to the height of the sensor.

As a result, the sensor is protected from being damaged due to collisions with obstacles. Furthermore, because the sensor will be less prone to being damaged, the navigational system that uses the sensor will be more reliable.

The protrusion may be located on a front portion of the body, the front portion being adjacent to a front edge of the body. As a result, when the robot is moving towards a low obstacle, the protrusion will stop the robot from travelling under the obstacle completely. This not only protects the sensor from damage, but also helps to reduce the risk of the protruding sensor causing the robot to become wedged under the obstacle. What is more, by positioning the protrusion on the front portion of the body, it is as far away from the sensor as possible whilst still being positioned in front of it, and so presents a smaller obstruction in the field of view of the sensor than if it was located closer to the sensor.

The front portion may be downwardly sloped towards the front edge of the body, and the protrusion may have a forward-facing edge that extends vertically from the sloped front portion. Accordingly, when the sloped front of the robot cleaner gives rise to an increased risk of wedging, the vertical front edge of the protrusion will counteract the risk by abutting against any oncoming obstacles and preventing the front portion from becoming wedged under the obstacle.

The protrusion may comprise two stages, a lower stage extending to a height that is at least equal to the height of the top surface of the body, and an upper stage extending to a height that is at least equal to the height of the sensor. As a result, the lower stage of the protrusion can protect the robot cleaner against the risk of the front of the robot becoming wedged, whilst the upper stage of the protrusion can protect the sensor from damage. The two stages may be shaped and sized differently to maximise the effectiveness of each stage for the function that it is required to carry out. For example, the part of the protrusion that protects the sensor may not need to be as large as the part of the protrusion that protects against wedging, and so the upper stage can be made smaller than the lower stage. This reduces the amount of materials used and therefore cost of manufacture, and also reduces the weight of the machine. It also allows the part of the protrusion that is visible to the sensor to be made smaller such that is presents a smaller visible obstruction in the field of view of the sensor.

The forward facing edge of the upper stage may be positioned behind the forward-facing edge of the lower stage. This allows the robot to travel further under an obstacle if there is no risk of wedging before being forced to stop. This allows the robot cleaner to cover a greater area when cleaning around obstacles that could cause damage to the sensor.

The sensor may be one of an infra-red sensor assembly, a laser distance sensor assembly and a camera assembly. The camera assembly may be a panoramic annular lens camera which comprises a dome-shaped lens protruding from the top surface of the body. By using a PAL camera a 360° omni-directional image of the area surrounding the robot can be captured, and the robot cleaner can more effectively navigate around an environment in which it is located.

The body may comprise a separating apparatus part that is removable from the remainder of the body and the protrusion may be provided on the separating apparatus part. By locating the separating apparatus part at the front of the robot cleaner, it acts as a resilient bumper for the robot cleaner when it comes into contact with obstacles. The separating apparatus part does not contain any delicate electronics, unlike the remainder of the body of the robot cleaner, and so there is a reduced risk of any collisions with obstacles causing damage to the electronics and controls. Therefore, it is also beneficial to position the protrusion on the separating apparatus part, as it will reduce the risk of any collision with the protrusion causing damage to any of the electronics or other delicate parts of the robot.

What is more, by positioning the protrusion on the top of the removable separating apparatus part, if it is damaged during use it is much easier and cheaper to replace the separating apparatus part than to try and fix or replace the remainder of the body.

BRIEF DESCRIPTION OF THE DRAWINGS

In order that the present invention may be more readily understood, embodiments of the invention will now be described, by way of example, with reference to the following accompanying drawings, in which:

FIGS. 5b and 6b show a robot cleaner according to the present invention navigating around the same furniture shown in corresponding FIGS. 5a and 6a.

DETAILED DESCRIPTION OF THE INVENTION

Figure 1:
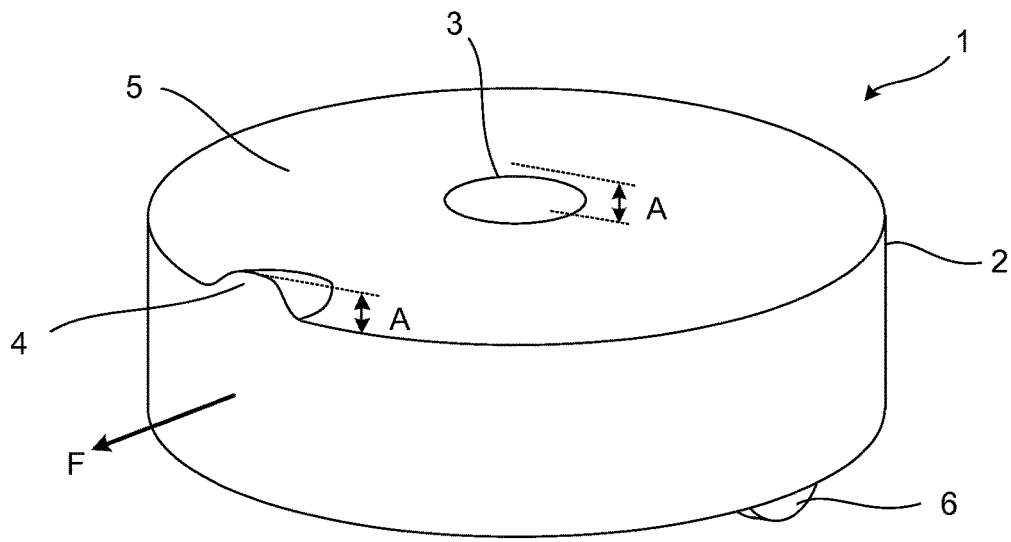
FIG. 1 is a perspective view of a first embodiment of a robot cleaner.

FIG. 1 shows a first embodiment of a robot cleaner 1. The robot cleaner 1 comprises a body 2. A sensor 3 is provided on the top surface 5 of the body 2. The sensor 3 protrudes above the top surface 5 of the body 2 which allows the sensor 3 to be omnidirectional and work in any direction around the robot if required. For example, the sensor 3 could be an infra-red sensor assembly that is able to detect an IR beam, a laser distance sensor assembly, or a camera assembly. The sensor 3 could be a camera assembly in the form of a panoramic annular lens (PAL) camera. By protruding from the top surface of the robot cleaner 1, a PAL camera is able to capture a 360° image around the robot cleaner 1. Drive units 6, for example wheels, are provided on the robot to allow it to drive autonomously around a local environment.

The sensor 3 protrudes above the top surface 5 of the body 2 and so is vulnerable to damage while the robot cleaner moves around a room, for example from low furniture. If the sensor 3 were to be damaged this could result in the robot cleaner 1 being unable to navigate correctly. To reduce the likelihood of the sensor 3 being damaged in his way, the robot cleaner 1 is provided with a protrusion 4 that is positioned forward of the sensor with respect to a forward driving direction of the robot cleaner represented by arrow F in FIG. 1. The protrusion is positioned on a front portion of the body which is adjacent to the front edge of the body 2. The front portion of the body 2 forms part of the top surface 5 of the robot 1. The protrusion 4 protrudes above the top surface 5 of the body 2 and extends to a height that is equal to the height of the sensor 3, as represented by arrows A. In alternative embodiments, the protrusion may extend to a height that is greater than the height of the sensor 3, but the minimum required for the sensor to be protected is that the protrusion 4 must extend to a height that is at least equal to the height of the sensor 3, as shown in FIG. 1.

Therefore, if the robot encounters a low obstacle that is higher than the top surface 5 of the body 2, but lower than the height of the sensor 3, the protrusion 4 will contact the obstacle before the sensor 3. When the protrusion 4 makes contact with the obstacle the robot 1 will register this as a bump, and then adjust its trajectory to navigate around the obstacle. Accordingly, the obstacle would not make contact with the sensor 3, and any potential damage to the sensor 3 is avoided.

The protrusion 4 is positioned on a front portion of the body 2 because in this position, it is as far away from the sensor as possible, and so presents as small a visible obstruction as possible within the field of view of the sensor 3.

Figure 2:
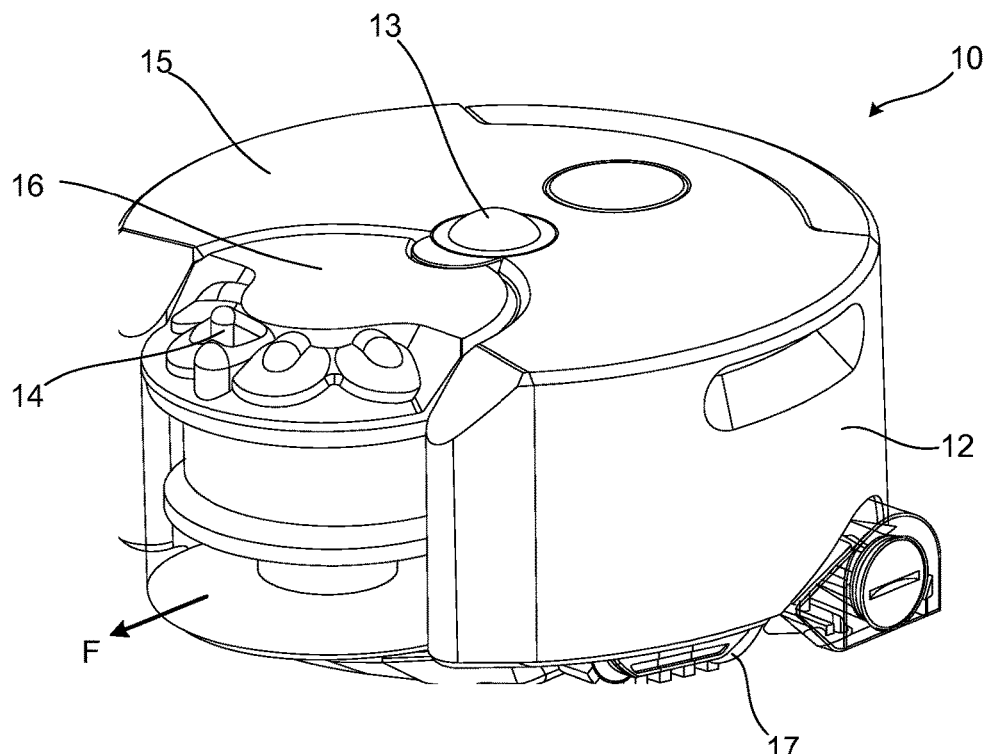
FIG. 2 is a perspective view of a second embodiment of a robot cleaner.
Figure 3:
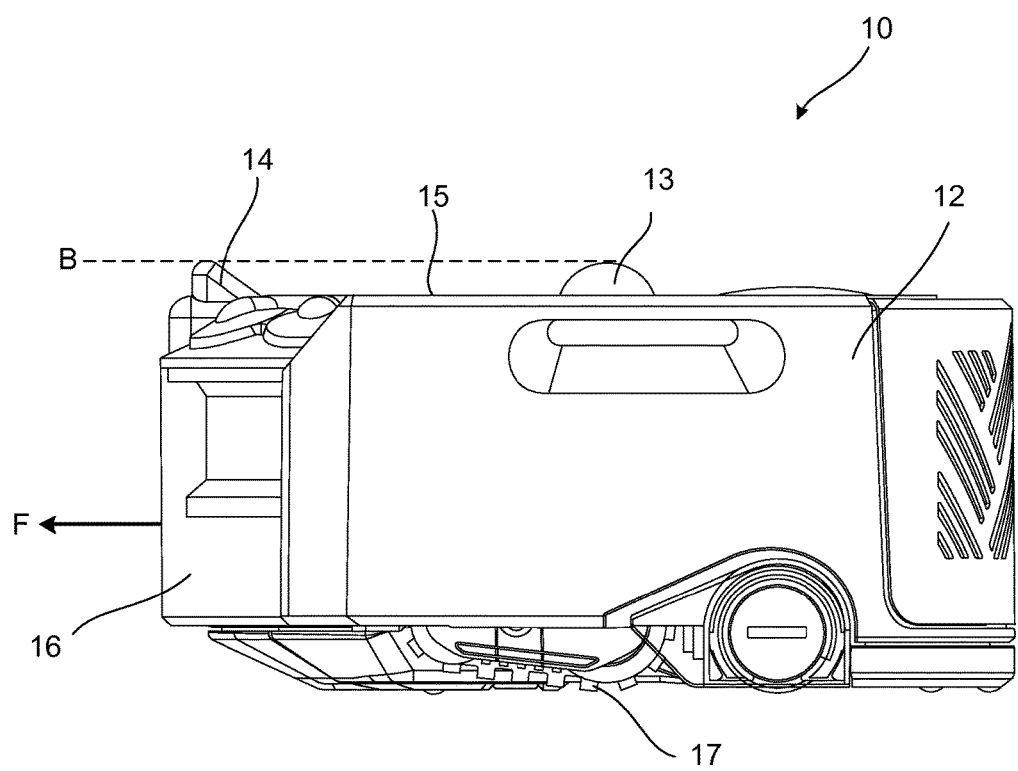
FIG. 3 is a side view of the robot cleaner of FIG. 2.

FIGS. 2 and 3 show another embodiment of a robot cleaner 10. The robot cleaner 10 comprises a body 12 having a panoramic annular lens (PAL) camera 13 protruding from the top surface 15 of the body 12. The main body 12 comprises a detachable separating apparatus 16 that is located at the front of the robot cleaner 10 with respect to a forward driving direction of the robot cleaner represented by arrow F. The protrusion 14 is formed on the top surface of the separating apparatus 16 forward of the position of the camera 13. The location at which the protrusion 4 is positioned therefore corresponds to a front portion of the body 2, the front portion of the body being adjacent to the front edge of the body, and the front edge of the body being the front edge of the separating apparatus 16. In this embodiment the front portion is positioned between the top surface 15 of the body 12 and the front edge of the body. A dashed line B in FIG. 3 shows that the protrusion 14 extends to a height that is the same as the height of the camera 13 above the top surface 15. The drive units on robot cleaner 10 are continuous tank tracks 17.

Figure 4:
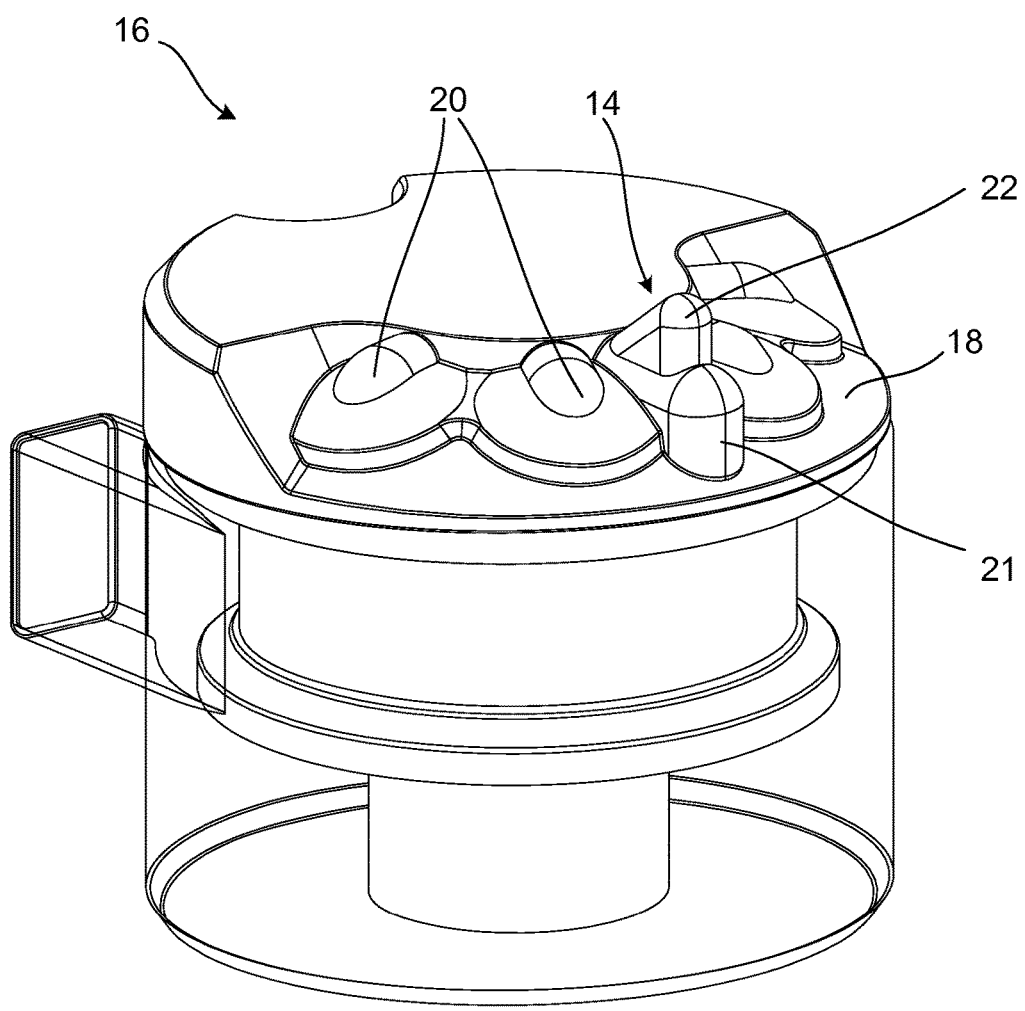
FIG. 4 shows the separating apparatus of the robot cleaner of FIGS. 2 and 3.

FIG. 4 shows the separating apparatus 16 of robot cleaner 10 from FIGS. 2 and 3. A portion of the top of the separating apparatus 16 is recessed, and tops of the inner cyclones 20 are visible on a sloped front edge 18. Also positioned on the sloped front edge 18 is the protrusion 14. The protrusion 14 comprises two stages: a lower stage 21 and an upper stage 22. The lower stage 21 sits on the sloped front edge 18 and provides a base on which the upper stage 22 sits. Both the lower stage 21 and the upper stage 22 have forward-facing edges that extend vertically upwards.

Figure 5A:
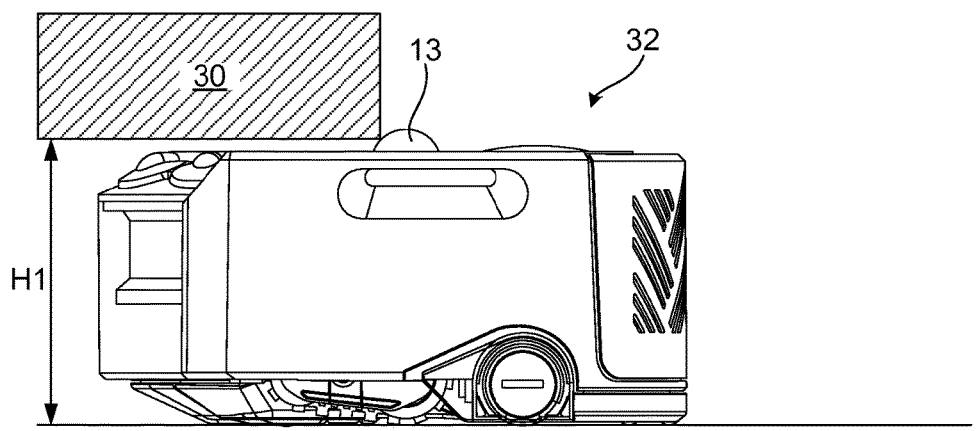
FIGS. 5a and 6a show a robot cleaner not according to the present invention navigating around furniture.
Figure 5B:
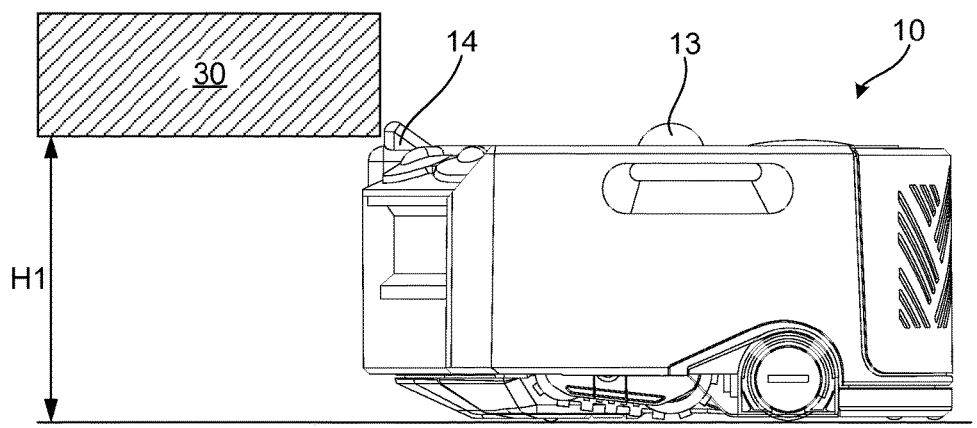

FIGS. 5a and 5b show a piece of furniture 30 which sits at a height H1 from the floor surface. The robot 32 in FIG. 5a does not have a protrusion on the front, and is able to pass under the furniture 30 until the camera 13 hits the furniture. As has already been described, this could cause enough damage to the camera 13 that the robot 32 can no longer navigate, particularly if the camera 13 is repeatedly hit by the furniture 30 over an extended period of time. In contrast, the robot 10 in FIG. 6b is provided with a protrusion 14, and it can clearly be seen that the upper stage of the protrusion 14 comes into contact with the furniture 30 before the camera 13, and so prevents the camera 13 being damaged.

Figure 6A:
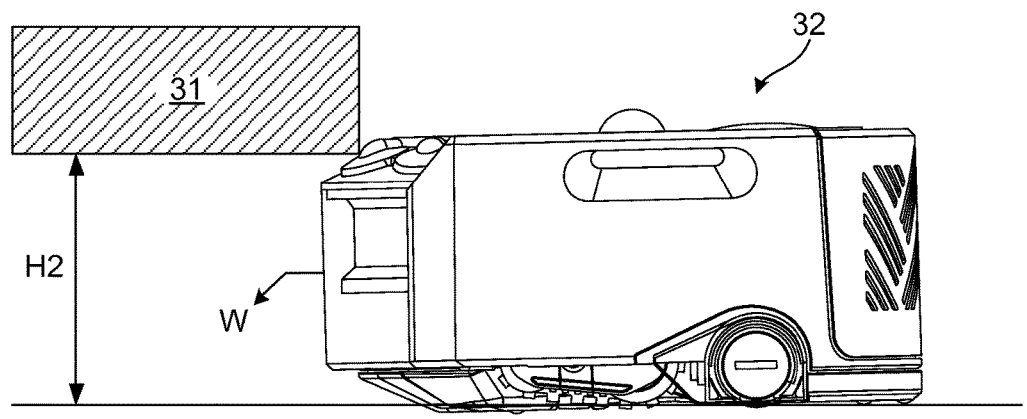
Figure 6B:
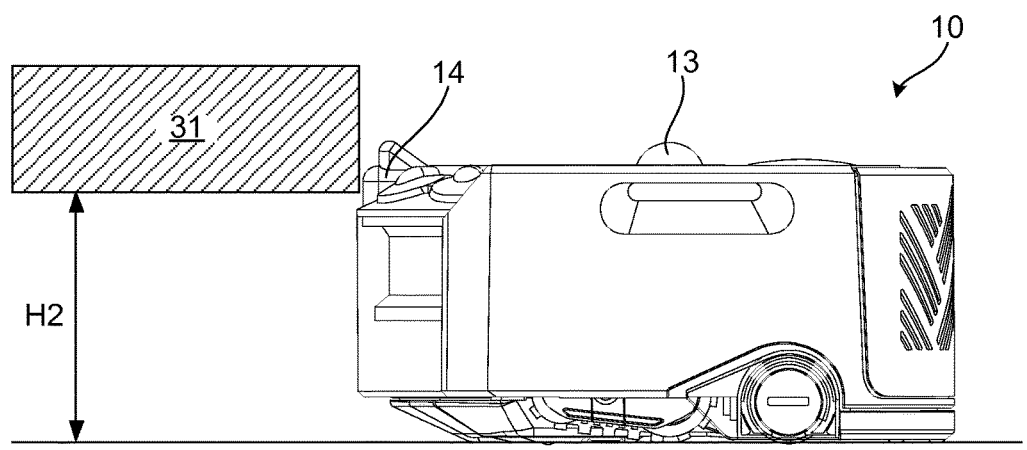

FIGS. 6a and 6b show a piece of furniture 31 at a height H2 which is slightly lower than H1. FIG. 6a shows the top of the front of the robot cleaner 32 slopes downwards but does not have a protrusion. This can lead to the robot becoming "wedged" under furniture, where the front of the robot 32 is driven down towards the ground when it comes into contact with the furniture 31, as represented by arrow W. If the robot cleaner 32 contacts the furniture 31 with a great enough force, a point could be reached where it is no longer able to go forwards or backwards due to it being wedged between the furniture and the floor. This is shown in FIG. 6a. At this point the robot 32 would not be able to complete the cleaning operation and would have to present an error message to a user. The user would then need to free the robot 32 from its wedged position before it was able to continue cleaning.

In contrast, in FIG. 6b the robot 10 is provided with protrusion 14. In this instance, the vertical forward facing edge of the lower stage of the protrusion 14 contacts the furniture 31, which stops the sloped front top edge coming into contact with the furniture 31. Therefore, when the protrusion 14 contacts the furniture 31, the robot 10 will not be driven down towards the floor. Instead, the robot 10 will detect the contact as a bump with an obstacle and will adjust its trajectory to navigate around the obstacle.

Whilst particular embodiments have thus far been described, it will be understood that various modifications may be made without departing from the scope of the invention as defined by the claims.

The invention claimed is:

1. A robot cleaner comprising:
   a body; and
   a sensor protruding from a top surface of the body,
   wherein the body comprises a protrusion positioned forward of the sensor relative to a forward driving direction of the robot cleaner, the protrusion extending to a height that is at least equal to the height of the sensor and located on a front portion of the body, the front portion being adjacent to a front edge of the body, wherein the front portion is downwardly sloped towards the front edge of the body, and the protrusion has a forward-facing edge that extends vertically from the sloped front portion, and wherein the protrusion comprises two stages, a lower stage extending to a height that is at least equal to the height of the top surface of the body, and an upper stage extending to a height that is at least equal to the height of the sensor.

2. The robot cleaner of claim 1, wherein the forward facing edge of the upper stage is positioned behind the forward-facing edge of the lower stage.

3. The robot cleaner of claim 1, wherein the sensor is one of an infra-red sensor assembly, a laser distance sensor assembly and a camera assembly.

4. The robot cleaner of claim 3, wherein the camera assembly is a panoramic annular lens camera which comprises a dome-shaped lens protruding from the top surface of the body.

5. The robot cleaner of claim 1, wherein the body comprises a separating apparatus part that is removable from the remainder of the body and the protrusion is provided on the separating apparatus part.

* * * * *